Nov. 12, 1957 R. B. STERMON 2,813,194
UPSETTING MACHINE
Filed Jan. 10, 1957 2 Sheets-Sheet 1

WITNESSES
Donald Smith
Wm. B. Sellers.

INVENTOR
Rubin B. Stermon.
BY Arthur T. Stratton
ATTORNEY

Nov. 12, 1957  R. B. STERMON  2,813,194
UPSETTING MACHINE
Filed Jan. 10, 1957  2 Sheets-Sheet 2
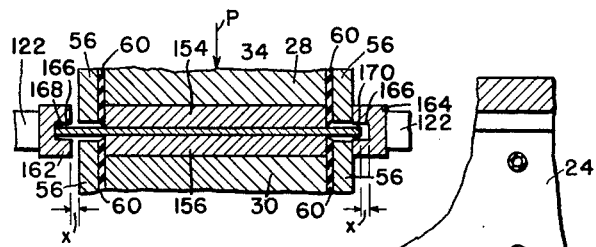
Fig. 4.
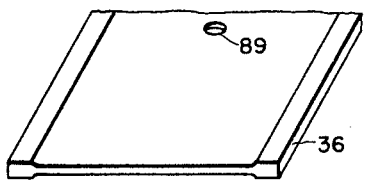
Fig. 3.
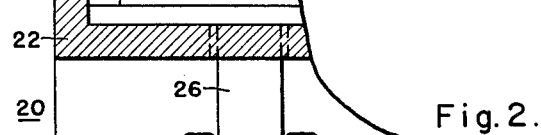
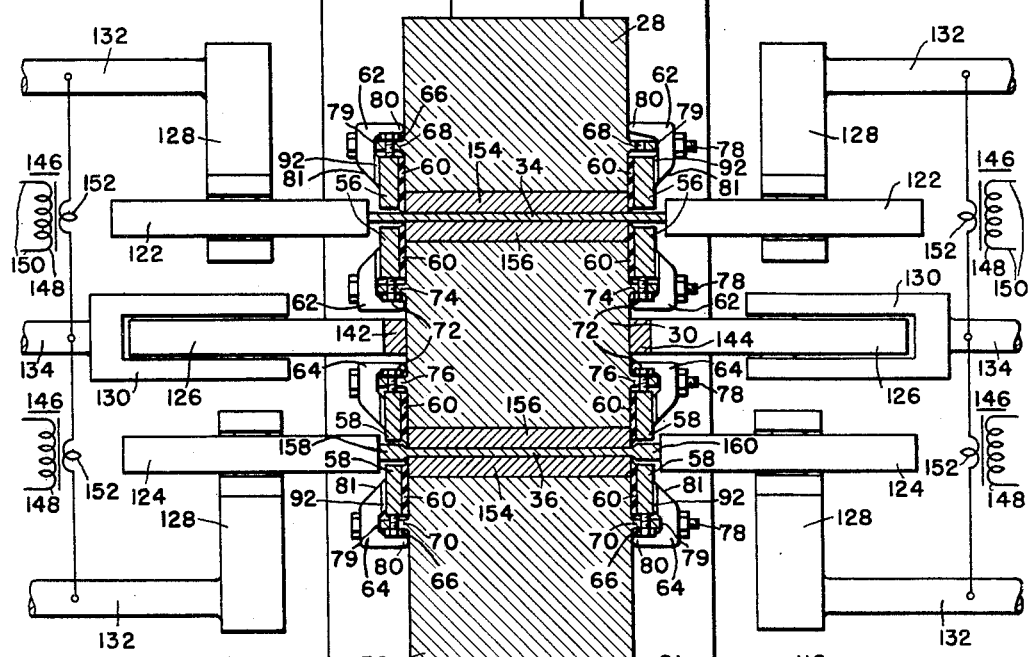
Fig. 2.
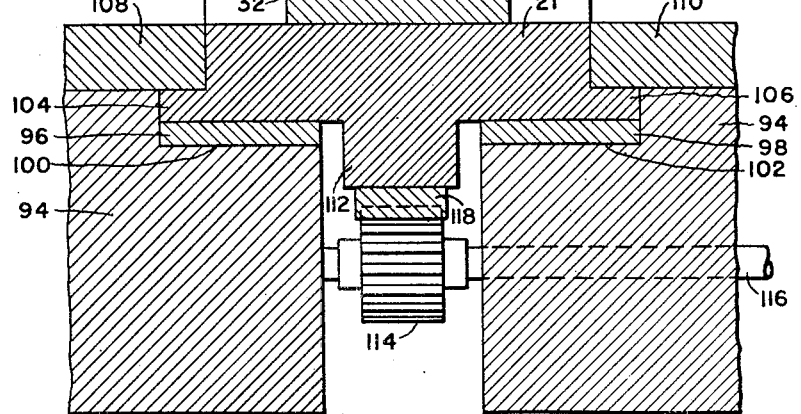

United States Patent Office 2,813,194
Patented Nov. 12, 1957

2,813,194
UPSETTING MACHINE

Rubin B. Stermon, North Versailles Township, Allegheny County, Pa., assignor to Westinghouse Electric Corporation, East Pittsburgh, Pa., a corporation of Pennsylvania Application January 10, 1957, Serial No. 633,435

21 Claims. (Cl. 219—152)

The present invention relates to a hot upsetting machine and, more particularly, to a machine of the character described adapted for simultaneously upsetting opposing edges of a plurality of plates.

Such upsetting machines are arranged to form a metallic plate or other ductile material to a desired configuration by the application of force edgewise in the plane of the plate. The deformation or upsetting of the plate is facilitated by heating that portion of the plate being upset, for example, by passing electric current therethrough.

Heretofore, it has been the practice to upset one edge only of the plate and then to remove the plate and reverse the same within the machine in order to upset the opposing edge of the plate. In this manner, a plate having a cross-sectional configuration in the form of an I-beam, shallow U-beam or a Z-beam has been formed. Because one edge only of the plate has been hot-upset during one operating step of the machine, warpage or camber is induced in the plate by the contraction of the upset or flanged portion when the latter cools. Additionally, the application of upsetting force to one edge only of the plate required added supporting means and clamping pressure for the plate to counteract the force exerted by the upsetting means. The structure of prior upsetting machines has been complicated further by the fact that the forming rolls thereof are moved relative to the plate supporting means of those machines.

In the operation of known machines, it is necessary to remove the plate being flanged and to reposition the plate with its singly flanged edge downward in order to upset the other edge. On very light upsets the camber may be pounded out by hammering on the unflanged edge until the flanged edge is seated properly while light die pressure is being applied to the plate clamp in the machine. With heavier upsets this usually is not effective and an additional decambering step must be employed. The aforementioned method of pounding the plate edge to seat the previously flanged edge causes excessive surface contamination to be imparted to the plate from the clamping dies of the machine. In the case of plates fabricated from certain materials, such cold working lowers the recrystallization temperature of the material an intolerable amount.

It is well known that the portion of the plate being upset cannot be fully formed, by one application of upsetting force, into the desired configuration thereof when the width of that portion of the plate which is unsupported exceeds the thickness thereof by a ratio greater than 3.5:1 for certain materials. Prior upsetting machines suffer from the further disadvantage that the upsetting dies of the machine have to be readjusted after each of the two passes required to completely upset the last-mentioned plates. Because of the number of passes required for prior machines to impart the desired configuration to a single plate, the output of prior machines has been severely limited.

In view of the foregoing, an object of the present invention is to provide a hot upsetting machine which can be operated quickly and efficiently.

Another object of the invention is to provide a machine of the character described in which opposing edges of a plate being deformed by the machine can be upset simultaneously.

A further object of the invention is to increase the productivity of a hot upsetting machine.

Still another object of the invention is to facilitate the adjustment of a hot upsetting machine essential to form a varied number of configurations therein.

A still further object of the invention is to provide means for double-upsetting in a machine of the character described without the necessity of adjusting the machine between passes.

These and other objects, features and advantages of the invention will be made apparent during the forthcoming description of exemplary forms thereof with the description being taken in conjunction with the accompanying drawings, wherein:

Fig. 2 is a sectional view of Fig. 1 taken along reference lines II—II thereof; with the machine having been actuated to its clamping and upsetting position;

Fig. 3 is a partial perspective view of a doubly flanged plate produced by the machine of Figs. 1 and 2; and Fig. 4 is a partial sectional view of Fig. 1 taken along reference lines II—II thereof, and showing additionally a decambering means arranged in accordance with the invention.

Figure 1:
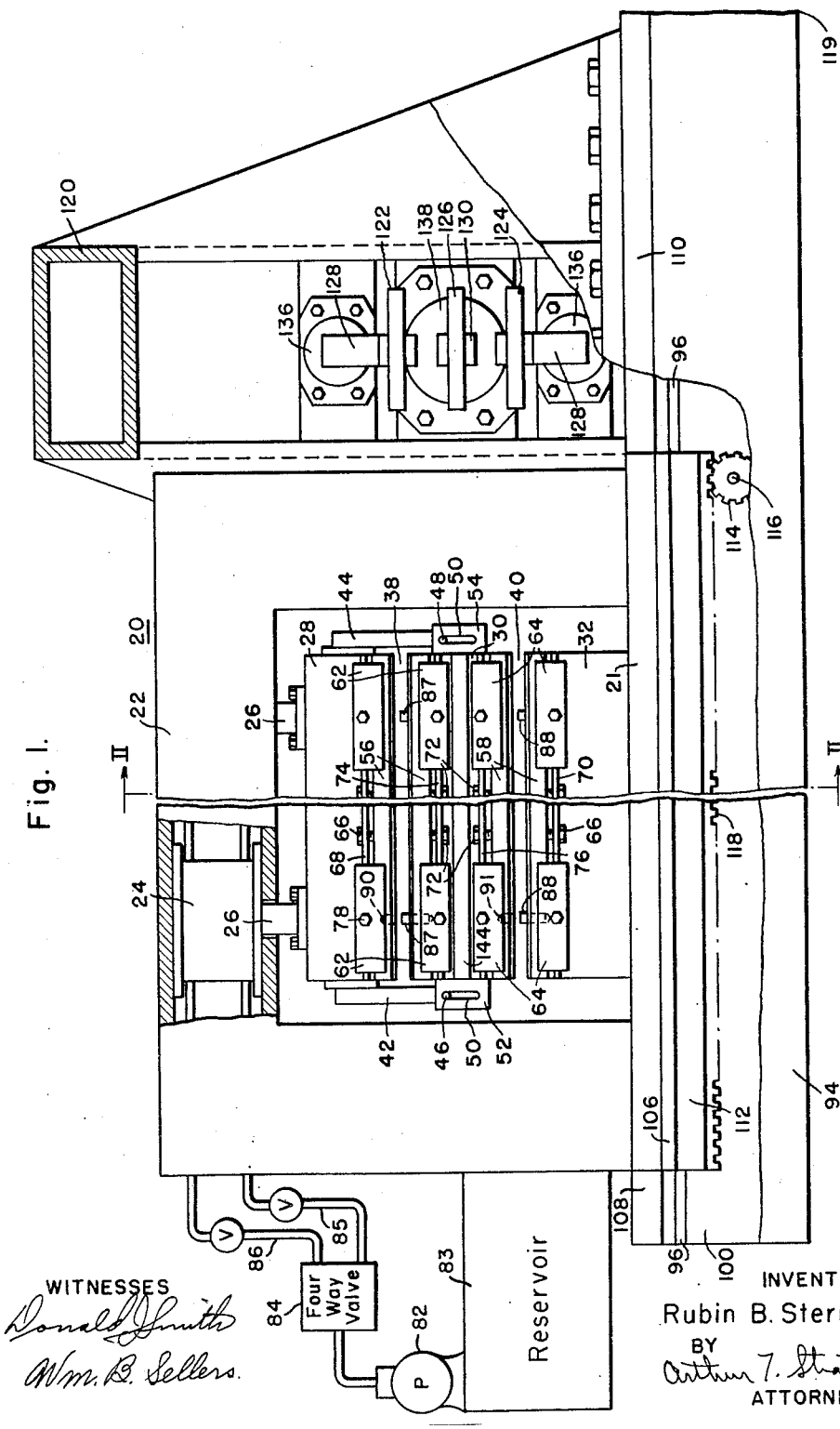
Figure 1 is a side elevational view, partly in section, of one form of hot upsetting machine constructed according to the principles of the invention.

According to the invention, a hot upsetting machine is provided with means for supporting two or more plates to be flanged or upset by the machine. Opposing pairs of forming rolls are arranged to contact and simultaneously upset opposing edges of the plates. In one arrangement of the invention, the upsetting machine is constructed in a manner that both opposing edges of a plate can be partially and simultaneously upset in one portion of the machine and then fully upset by transferring the plate to another portion of the machine. The upsetting machine is further arranged that only those opposing edges of the plates to be upset are heated by an electrical current passing through selected portions of the machine.

Referring now more particularly to the drawings, the exemplary form of the invention illustrated therein comprises a rectangular superstructure 20 secured to a movable base member 21 and wherein the uppermost portion or overhead beam 2 2thereof supports a plurality of hydraulic cylinders 24. Mounted within each of the cylinders 24 is a piston and rod arrangement, indicated generally by the reference character 26, which is adapted to exert downward pressure upon a series of stacked or overlying die blocks. In this example of the invention, three such die blocks 28, 30 and 32 are utilized, and inserted therebetween are plates 34 and 36 the opposing or outward edges of which are to be upset during subsequent operation of the machine. The die blocks 28, 30 and 32 are thus arranged with suitable openings 38 and 40 therebetween for insertion of the aforementioned plates 34 and 36, when the die blocks are separated by the cylinder and piston arrangements 24 and 26, respectively, in a manner presently to be set forth.

To the upper die block 28, a pair of downwardly extending arms 42 and 44 are secured individually at extremities of the upper die block. Attached to the lower end of each of the arms 42 or 40 is a pin 46 or 48 which is inserted for movement into a slot 50 formed in each of a pair of outwardly extending brackets 52 and 54. The brackets 52 and 54 are secured at respective ends of the intermediate die block 30 and by cooperation with the pins 46 and 48, forms a lost-motion connection which is arranged to raise the intermediate block 30 from the lowermost die block 32 after the upper die block 28 has been raised a prescribed distance as determined by the length of the slots 50. The slots 50 are formed with a length appropriate to the raising of the die blocks 28 and 30 such that substantially equal openings exist between the die blocks 28, 30 and 32 when the upper die block is fully raised. It is contemplated by the invention that a greater number than three die blocks can be provided and that the added die blocks (not shown) can be coupled to the intermediate die block 30 by a similar lost-motion connection.

Positioned adjacent the openings 38 and 40, which are formed between the respective die blocks 28, 30 and 32, are pairs of upset limiting plates 56 and 58. The plates 56 and 58 are insulated from the die blocks 28, 30 and 32 by means of mica or other suitable insulating material 60 (Fig. 2). The upset limiting plates are adjustably secured to the die blocks 28, 30 and 32 by associated pairs of clamping members 62 and 64 spaced longitudinally along the length of the die blocks 28, 30 and 32 (Fig. 1). The gap between the pairs of upset limiting plates 56 and 58, respectively, is adjusted and limited by set screws 66 threaded through tapped apertures formed in the ribs 68 and 70, formed integrally with and running longitudinally along the length of the upper and lower die blocks 28 and 32, respectively, and by set screws 72 tapped through ribs 74 and 76 formed similarly on the intermediate die block 30.

After adjustment of the upset limiting plates 56 and 58 by means of the set screws 66 and 72, the clamping members 62 and 64 are secured in clamping engagement with the upset limiting plates by tightening the bolts 78 inserted through suitable apertures in the clamping members 62 and 64 and the die blocks 28, 30 and 36. Each of the clamping plates 62 and 64 is provided with an inwardly facing groove 79 (Fig. 2) arranged such that the clamping plate clears the associated rib 68, 70, 74 or 76 passing thereunder. Each clamping plate 62 or 64 is further formed with a heel portion 80 for engaging the lateral surface of the appropriate die block and with a toe portion 81 adapted to engage the upset limiting plates 56 or 58. Insulation 92 is placed between each of the toe portions 81 and the associated upset limiting plate 56 or 58 to prevent the unsupported portions of the plates 34 and 36, which portions are intended to be upset, from being short circuited by contact with the upset limiting plates 56 or 58.

After the plates 34 and 36 to be upset are positioned between the die blocks 28, 30 and 32, the hydraulic cylinders 24 are actuated to lower and to press the die blocks 28, 30 and 32 to the closed position indicated in Fig. 2 of the drawings. This is accomplished by admitting suitable hydraulic liquid into the cylinders 24, to which it is supplied under pressure by means of a pump 82 from a reservoir 83. Upward and downward movement of the piston within the cylinders 24 is controlled by means of a four-way, double solenoid-actuated valve 84 which is manipulatable to admit liquid into either one of the conduits 85 and 86 connected to opposite ends of the cylinders 24, respectively.

When placing the plates 34 and 36 within the machine, the former are positioned and centered relative to the die blocks 28, 30 and 36 by inserting die block indexing pins 87 and 88 (Fig. 1) into suitably disposed apertures 89 (Fig. 3) provided in each of the plates 34 and 36. Upon lowering the die blocks 28 and 30 by means of the hydraulic cylinders 24 and associated mechanisms, the indexing pins 87 and 88 extending through the apertures 89 are inserted into recesses 90 and 91 provided at the undersurfaces of the upper and intermediate die blocks 28 and 30, respectively.

The lowermost die block 32 rests on the base member 21 of the upsetting machine and is secured thereto for movement with the base member. The base member 21 is movably mounted relative to bed 94 by disposition of the base member upon a pair of parallel greased skids 96 and 98 (Fig. 2), or the like, mounted atop shoulder portions 100 and 102 of the bed 94. Adjacent the lower surface of the base member 21, a pair of ribs 104 and 106 are in this example integrally formed therewith and are adapted to cooperate with flange members 108 and 110, secured to the upper surface of the bed 94 in order to prevent upward movement of the housing 20. On the undersurface of the base member 21, a downwardly extending rib 112 is formed integrally with the base member and is arranged to run substantially along the entire length thereof.

Movement of the base member 21, the superstructure 20, and the die blocks 28, 30 and 32 is effected by rotating a gear 114 by suitable means (not shown) for applying the required torque to gear shaft 116. Upon rotation, the gear 114 engages a cogged or toothed strip 118 secured to the rib 112 and lying coextensively therewith. It will be appreciated that the bed 94 extends a sufficient length beyond the broken-off portion 119 (Fig. 1) to permit the die blocks 28, 30 and 32 to be inserted through a roller housing structure 120, presently to be elucidated.

After placing the plates 34 and 36 to be upset between the die blocks 28, 30 and 32, the base member 21 is moved by rotation of the gear 114 and associated mechanism through the roller housing structure 120 wherein are supported a plurality of pairs of forming rolls 122 and 124, two pairs being utilized in this example of the invention to correspond with the number of plates 34 and 36 to be upset, and a pair of follower rolls 126. The forming rolls 122 and 124 and the follower rolls 126 are each mounted for rotative movement upon arm and axle arrangements indicated generally by the reference characters 128 and 130. Each of the latter mechanisms is mounted at the outward extremities of piston rods 132 and 134 coupled to the respective cylinder and piston arrangements 136 and 138. Air or other fluid under pressure is supplied to the piston and cylinder arrangements 136 and 138 for urging the forming rolls 122 and 124 into bearing contact with the outward edges of the plates 34 and 36, respectively, and for urging the follower rolls 126 into electrical contact with contacting strips 142 and 144 disposed individually on each side of the intermediate die block 30.

In order to heat the unsupported portions of the plates 34 and 36 being upset, there is provided a source of electrical current comprising the step-down transformers 146, each having the primary winding 148 thereof coupled to a source of alternating potential 150. The secondary winding 152 of each transformer 146 is coupled to one of the follower rolls 126 and to one of the forming rolls 122 or 124, respectively. From the contracting strips 142 and 144 when engaged by the follower rolls 126, current passes into the intermediate die block 30 and thence to the unsupported portions of the plates 34 and 36, which portions are engaged by the forming rolls 122 and 124, respectively. Heating of the entire plate 34 or 36 is prevented by usage of inserts 154 and 156 fabricated from an electrically conductive material (Fig. 2), secured to the die blocks 28, 30 and 32 along the length thereof, and pressed into engagement with either side of the plates 34 and 36. In this arrangement the inserts 154 and 156 short-circuit electrically the plates 34 and 36 with the exception of those portions thereof which are unsupported and which are intended to be upset by bearing engagement with the respective forming rolls 122 and 124.

In the arrangement shown in detail in Fig. 2, the upsetting machine is adapted for upsetting a pair of plates 34 and 36 wherein the width of the unsupported portions of plate 34 exceeds the thickness thereof. The upset limiting plates 56 are adjusted such that, during one pass of the die blocks 28, 30 and 32 between the forming rolls 122, the latter will partially upset the upper plate 34 to the desired configuration. At the same time the upset limiting plates 58 are adjusted relative to the lower plate 36 with the result that the partially upset portions 158 and 160 thereof will be fully upset by the forming rolls 124 to the desired configuration upon passing between the forming rolls. Thus, in one application of the invention, the plate 34 is partially upset in the upper position of the machine, i. e., between the die blocks 28 and 30 and then transferred to the lower position, as indicated by the plate 36, to be fully upset by the forming rolls 124 in a succeeding passage of the die blocks relative to the forming rolls. Obviously, where plates 34 and 36 have sufficient thickness to be upset in one pass, they can be fully upset simultaneously during one pass of the die blocks 28, 30 and 32 relative to the respective forming rolls 122 and 124. It will be equally apparent that a greater number of die blocks and forming rolls than those shown can be utilized with the result that three or more plates can be upset simultaneously.

In the event that plates 34 or 36 are delivered to the upsetting machine with a slight camber, one arrangement for removing the camber, without cold working the plates, is shown in Fig. 4 of the drawings. In this arrangement a pair of elongated strips 162 and 164 are employed, which strips are approximately equal in length to that of the plates 34 or 36, with the former being shown in Fig. 4 for illustrative purposes. Each of the elongated strips has a longitudinally coextending groove 166 formed on a face thereof and thus the strips are adapted to cap the unsupported edges 168 and 170, respectively, of the plate 34. The grooves 166 are of such depth that for a given width of the plate 34 that the inward faces of the elongated strips will engage the outward surfaces of the upset limiting plates 56, when the plate 34 to be upset is straightened and thus is centered along its length relative to the die blocks 28 and 30. At the same time the lateral edges 168 and 170 of the plate 34 engage the respective bottoms of the grooves 166.

Assuming the plate 34 (Fig. 4) has a slight camber represented by the distances X, the plate is centered as nearly as possible between the die blocks 28 and 30, and a light pressure P is applied thereto, which pressure induces sufficient friction between the plate 34 and the die blocks to prevent the camber from returning when the plate is straightened. The elongated, grooved strips 162 and 164 are then placed over the edges 168 and 170, respectively, and the die blocks are passed between the forming rolls 122, in the manner explained heretofore, with the exception that no current is applied. The engagement of the forming rolls 122, respectively, with the outward faces of the elongated strips causes the inward faces thereof to engage the upset limiting plates 56 and to terminate the inward movement of the elongated strips. As pointed out heretofore, the depth of the grooves 166 is formed such that the plate 34 is centered and straightened thereby to eliminate the camber X relative to the die blocks 28 and 30. If desired, suitable means (not shown) can be employed for supporting the elongated strips 162 and 164 during the decambering operation. Obviously, a similar pair of elongated decambering strips can be provided for the lower plate 36 to be upset (Fig. 2).

From the foregoing description, it will be apparent that a novel and efficient hot upsetting machine has been disclosed. The machine is arranged to produce an I-beam or other doubly flanged plate by suitable manipulation of the upset limiting plates 56 and 58. Camber or warpage of the resulting beam or flanged plate is obviated by simultaneously upsetting opposing edges thereof. The productivity of the machine is increased substantially by the simultaneity of the operation and can be increased still further by the simple addition of die blocks and forming rolls, as pointed out heretofore. Therefore, numerous embodiments of the invention exemplified herein will occur to those skilled in the art without departing from the scope of the appended claims.

I claim as my invention:

1. In a hot upsetting machine, the combination comprising a plurality of die blocks, means for moving at least one of said blocks toward and away from the others to provide an opening therebetween, at least one pair of opposing forming rolls, at least one pair of opposing follower rolls, upset limiting means secured to each side of said die blocks and disposed adjacent said opening, means for moving said die blocks between each pair of said rolls, means for urging said rolls toward the respective sides of said die blocks during movement thereof, and electrical circuitry for connecting said forming rolls and said follower rolls to a source of electric potential.

2. In a hot upsetting machine, the combination comprising a plurality of die blocks, means for moving selected ones of said blocks toward and away from the others to provide openings therebetween, a plurality of pairs of opposing forming rolls, a pair of opposing follower rolls, adjustable upset limiting means secured to each side of said die blocks and disposed adjacent said openings, means for moving said die blocks between each pair of said rolls, means for urging said rolls toward the respective sides of said die blocks during movement thereof, and electrical circuitry for connecting said forming rolls and said follower rolls to a source of electric potential.

3. In a hot upsetting machine, the combination comprising at least two die blocks arranged one above the other, means for raising and lowering the upper one of said die blocks to provide an opening therebetween, at least one pair of opposing forming rolls, a pair of opposing follower rolls, upset limiting means secured to each side of said die blocks and disposed adjacent said opening, means for moving said die blocks between each pair of said rolls, means for urging said rolls toward the respective sides of said die blocks during movement thereof, and electrical circuitry for connecting said forming rolls and said follower rolls to a source of electric potential.

4. In a hot upsetting machine, the combination comprising at least three die blocks arranged one above the other; means secured to the upper one of said die blocks for raising and lowering selected ones of said die blocks to provide openings therebetween; lost-motion means secured to intermediate ones of said stacked die blocks, said lost-motion means being linked to an upward adjacent one of said blocks; a pair of opposing follower rolls; at least two pairs of opposing forming rolls; upset limiting means secured to each side of said die blocks and disposed adjacent said openings; means for moving said die blocks between each pair of rolls; means for urging said rolls towards respective sides of said die blocks during movement thereof; and electrical circuitry for connecting said forming rolls and said follower rolls to a source of electric potential.

5. In a hot upsetting machine, the combination comprising at least two die blocks arranged one above the other; means for raising and lowering the upper one of said die blocks to provide an opening therebetween; a pair of upset limiting plates secured individually to opposite sides of each of said die blocks, said plates being disposed adjacent said opening and extending substantially along the length thereof; a plurality of clamping members secured to said die blocks and arranged in respective clamping relationship with said plates along the length thereof; a rib secured to each of said sides and disposed individually adjacent each said plates; a plurality of adjusting screws threaded through said ribs and engageable with said plates for spacing said plates relative to said opening; a pair of opposing follower rolls; at least one pair of opposing forming rolls; means for moving said die blocks between each pair of said rolls; means for urging said rolls towards respective sides of said die blocks during movement thereof; and electrical circuitry for connecting said forming rolls and said follower rolls to a source of electric potential.

6. In an upsetting machine, the combination comprising a plurality of die blocks; means for moving at least one of said blocks toward and away from the others to provide an opening therebetween, said opening being adapted to receive a plate to be upset; at least one pair of opposing forming rolls; upset limiting means secured to each side of said die blocks and disposed adjacent said opening; means for moving said blocks between said rolls; means for urging said rolls toward the respective sides of said blocks during movement thereof; and a pair of elongated decambering strips approximately equal in length to that of said plate, said strips each having a groove extending longitudinally along the length thereof and a face arranged to engage one of said upset limiting means, said grooves each being of a depth such that when the plate is centered relative to said die blocks the lateral edges of said plate engage the bottoms of said grooves respectively, at a position of engagement of both said strips with said upset limiting means, respectively.

7. In an upsetting machine, the combination comprising a plurality of die blocks, means for moving at least one of said blocks toward and away from the others to provide an opening therebetween in which a plate to be deformed can be mounted when said blocks are separated and clamped in place when said blocks are moved toward each other with opposing edges of said plate protruding beyond opposite respective sides of said blocks; at least one pair of opposing forming rolls mounted adjacent said sides of the die blocks for engagement with said opposite edges; upset limiting means secured to opposite sides of each said die blocks and disposed adjacent said openings but spaced apart farther than the confronting surfaces of said blocks; means for moving said die blocks relative to and between said rolls; and means for urging said rolls toward the respective sides of said die blocks during said relative movements.

8. In a hot upsetting machine, the combination comprising at least three die blocks; means for moving selected ones of said die blocks toward and away from the others to provide openings therebetween in which an equivalent number of plates to be deformed can be mounted when said blocks are separated and clamped in place when said blocks are moved toward each other, with opposing edges of each said plates protruding beyond opposite respective sides of said blocks; a plurality of pairs of opposing forming rolls, said pairs of rolls being mounted adjacent opposite sides of said blocks for engagement with said opposing edges respectively of the plates when so inserted; means for moving said die blocks relative to and between said rolls; at least one pair of opposing follower rolls mounted adjacent opposite sides of said die blocks, said die blocks being fabricated from an electrically conductive material; means for urging said forming rolls and said follower rolls into contact with said opposing edges of the plates and with said opposite sides of the die blocks, respectively; and electrical circuitry for connecting said forming rolls and said follower rolls to a source of electric potential.

9. In an upsetting machine the combination comprising at least three die blocks; means for moving selective ones of said blocks toward and away from the others to provide openings therebetween in which an equivalent number of plates to be deformed can be mounted when said blocks are separated and clamped in place when said blocks are moved toward each other, with opposing edges of each said plates protruding beyond opposite respective sides of said blocks; a pair of opposing forming rolls for each said openings, each pair of said rolls being mounted adjacent opposite sides of said blocks for engagement with said opposing edges of the associated plate when so inserted; means for moving said die blocks relative to and between said rolls; and means for urging said rolls toward said openings and said die blocks during said relative movement, said rolls being located in substantially the same transverse plane with respect to the direction of said relative movement.

10. In a hot upsetting machine, the combination comprising at least three die blocks fabricated from an electrically conductive material; means for moving selected ones of said blocks toward and away from the others to form openings therebetween in which an equivalent number of plates to be deformed can be mounted when said blocks are separated and clamped in place when said blocks are moved toward each other, with opposing edges of each said plates protruding beyond opposite respective sides of said blocks; a pair of opposing forming rolls for each said plate, each pair of said rolls being mounted adjacent opposite sides of said blocks for engagement with said opposing edges, respectively, of the associated plate when so inserted; means for moving said die blocks relative to and between said rolls; means for urging said rolls toward said openings and said die blocks during said relative movement, said rolls being located in substantially the same transverse plane with respect to the direction of said relative movement; and electrical circuitry for connecting said forming rolls and at least one of said die blocks to a source of electric potential.

11. In an upsetting machine, the combination comprising at least three die blocks movably mounted in a laterally adjacent array, means secured to an outermost one of said die blocks for moving selected ones of said die blocks to provide openings therebetween, lost-motion means secured to intermediate ones of said die blocks, said lost-motion means being linked to an outer adjacent one of said die blocks, a plurality of pairs of opposing forming rolls, means for moving said die blocks relative to and between said rolls, and means for urging said rolls toward opposite sides of said die blocks during said relative movement.

12. In an upsetting machine, the combination comprising a plurality of die blocks, means for moving at least one of said blocks toward and away from the others to provide an opening therebetween, at least one pair of upset limiting plates secured to at least one of said die blocks, said plates being disposed adjacent said opening and extending along the length thereof, a plurality of clamping members secured to said die blocks and arranged in clamping relationship with said plates along the length thereof, a pair of ribs secured to said one die block and disposed individually adjacent said plates, means secured to said ribs and engageable with said plates for spacing said plates relative to said opening, at least one pair of opposing forming rolls, means for moving said die blocks relative to and between said rolls, and means for urging said rolls toward opposing sides of said die blocks during movement thereof.

13. In a hot upsetting machine, the combination comprising a plurality of die blocks; means for moving at least one of said blocks toward and away from the others to provide an opening therebetween in which a plate to be deformed can be mounted when said blocks are separated and clamped in place when said blocks are moved toward each other, with opposite edges of said plate protruding beyond opposite reflective sides of said blocks; at least one pair of opposing forming rolls mounted adjacent opposite sides of said blocks for engagement with said edges, respectively, of the plate when thus inserted; at least one pair of opposing follower rolls mounted individually adjacent opposite sides of said blocks for engagement with said opposite sides; upset limiting means secured to each side of said die blocks and disposed adjacent said openings but spaced apart farther than the confronting surfaces of said blocks; means for moving said die blocks relative to and between said rolls; means for urging said rolls toward the respective sides of said die blocks during said relative movement; and electrical circuitry for connecting said forming rolls and said follower rolls to a source of electric potential.

14. In a hot upsetting machine, the combination comprising a plurality of die blocks, means for moving at least one of said blocks toward and away from others to provide an opening therebetween, at least one pair of opposing forming rolls, at least one pair of opposing follower rolls, means for moving said die blocks relative to and between each pair of said rolls, means for urging said rolls toward the respective sides of said die blocks during said relative movement, said follower rolls and said forming rolls being located in substantially the same transverse plane relative to the direction of said relative movement, and electrical circuitry for connecting said forming rolls and said follower rolls to a source of electrical potential.

15. In a hot upsetting machine, the combination comprising a plurality of die blocks; means for moving at least one of said blocks toward and away from the others to provide an opening therebetween in which a plate to be deformed can be mounted when said blocks are separated and clamped in place when said blocks are moved toward each other, with opposite edges of the plate protruding beyond opposite respective sides of said blocks; an electrically conductive member secured to a confronting surface of at least one of said die blocks, said member covering substantially the entire area of said confronting surface and arranged to form a contiguous fit with the adjacent surface of said plate when so inserted; at least one pair of opposing forming rolls disposed individually at opposite sides of said blocks for engagement with said opposite edges of the inserted plate; means for moving said die blocks relative to and between each pair of said rolls; means for urging said rolls toward the respective sides of said die blocks during said relative movement; and electrical circuitry for coupling said rolls and said conductive member to a source of electric potential.

16. In an upsetting machine, the combination comprising a plurality of die blocks; means for moving at least one of said blocks toward and away from the others to provide an opening therebetween in which a plate to be deformed can be mounted when said blocks are separated and clamped in place when said blocks are moved toward each other, with opposite edges of the plate protruding beyond opposite respective sides of said blocks; at least two upstanding centering pins secured to one of the opposing confronting surfaces of adjacent die blocks; the other of said surfaces having a like number of pin receiving recesses formed therein and aligned with said centering pins to permit insertion of the free ends of said pins when the blocks are moved toward each other, said pins cooperating with a like number of centering openings formed in said plate to center said plate when inserted; at least one pair of opposing forming rolls mounted at opposite sides of said blocks for engagement respectively with said opposing edges of the plate; means for moving said die blocks relative to and between said rolls; and means for urging said rolls toward the respective sides of said die blocks during said relative movement.

17. In a hot upsetting machine, the combination comprising a plurality of die blocks, means for moving at least one of said blocks toward and away from the others to provide an opening therebetween, at least one pair of opposing forming rolls, electrically conductive contacting means mounted adjacent said blocks, upset limiting means secured to opposite sides of said die blocks and disposed adjacent said opening, means for moving said die blocks relative to and between said rolls, means for urging said rolls and said contacting means toward the respective sides of said die blocks during said relative movement, a first electric circuit for connecting one of said pair of forming rolls and said contacting means to a source of electric potential, and a second electric circuit for connecting the other of said pair of forming rolls and said contacting means to a source of electric potential.

18. In a hot upsetting machine, the combination comprising at least three die blocks; means for moving selected ones of said blocks toward and away from the others to provide openings therebetween; a pair of opposing forming rolls for each said openings, said rolls being mounted adjacent opposite sides, respectively, of said blocks; electrically conductive contacting means mounted adjacent said die blocks; means for moving said die blocks relative to and between each pair of said rolls; means for urging said rolls and said contacting means toward said die blocks during said relative movement; and at least two electric circuits, said circuits being arranged for coupling said pairs of forming rolls, respectively, to said contacting means.

19. In a hot upsetting machine, the combination comprising at least three die blocks; means for moving selected ones of said blocks toward and away from the others to provide openings therebetween; a pair of opposing forming rolls for each said openings, said rolls being mounted adjacent opposite sides, respectively, of said blocks; electrically conductive contacting means mounted adjacent each side of said die blocks; means for moving said die blocks relative to and between each of said pairs of rolls; means for urging said rolls and said contacting means toward said die blocks during said relative movement; and at least four electric circuits, said circuits being arranged for coupling each one of said forming rolls, respectively, and the adjacent one of said contacting means to a source of electric potential.

20. In an upsetting machine, the combination comprising at least three die blocks; means for moving selected ones of said blocks toward and away from the others to provide openings therebetween; a pair of opposing forming rolls for each of said openings, each pair of said rolls being mounted adjacent opposite sides, respectively, of said blocks; an upset limiting means secured to opposite sides of said blocks for each of said openings, said upset limiting means being mounted adjacent said openings, respectively, but spaced apart farther than the confronting surfaces of said blocks, at least one of said upset limiting means being spaced farther apart than the remainder of said upset limiting means; means for moving said die blocks relative to and between said rolls; and means for urging said rolls toward the respective sides of said die blocks during said relative movement.

21. In a hot upsetting machine, the combination comprising at least three die blocks; means for moving selected ones of said die blocks toward and away from the others to provide openings therebetween; a pair of opposing forming rolls for each said openings, each pair of said rolls being mounted adjacent opposite sides, respectively, of said blocks; an upset limiting means secured to opposite sides of said blocks for each of said openings, said upset limiting means being mounted adjacent said openings, respectively, but spaced apart farther than the confronting surfaces of said blocks, at least one of said upset limiting means being spaced farther apart than the remainder of said upset limiting means; electrically conductive contacting means mounted adjacent at least one side of said die blocks; means for moving said die blocks relative to and between said rolls; means for urging said rolls and said contacting means toward said die blocks during said relative movement; and a plurality of electric circuits, said circuits being arranged for coupling at most a pair of said forming rolls, respectively, to said contacting means.

References Cited in the file of this patent

UNITED STATES PATENTS

| | | |
|---|---|---|
| 1,807,531 | Hopkins | May 26, 1931 |
| 1,867,936 | Benedetto | July 19, 1932 |
| 1,963,724 | Taylor | June 19, 1934 |
| 1,989,796 | Firth | Feb. 5, 1935 |
| 2,569,522 | Gruetjen | Oct. 2, 1951 |
| 2,768,282 | Pearson et al. | Oct. 23, 1956 |